May 5, 1942.   P. F. HAWLEY   2,281,766
LOGGING OF PERMEABLE FORMATIONS TRAVERSED BY WELLS
Filed Dec. 29, 1939

Inventor:
Paul F. Hawley
By Clarence H. Seeley
Attorney

Patented May 5, 1942

2,281,766

UNITED STATES PATENT OFFICE 2,281,766

LOGGING OF PERMEABLE FORMATIONS TRAVERSED BY WELLS

Paul F. Hawley, Tulsa, Okla., assignor to Stanolind Oil and Gas Company, Tulsa, Okla., a corporation of Delaware Application December 29, 1939, Serial No. 311,637

6 Claims. (Cl. 175—182)

This invention relates to the art of determining the location and permeability of earth formations penetrated by wells and more specifically it pertains to the measurement by electrical means of the thickness and relative permeability of formations encountered in the drilling of oil or gas wells.

The phenomenon generally relied upon to give an electrical indication of the permeability of the formations traversed by a well is that referred to as electro-filtration. Whenever an electrolyte flows through a permeable dielectric medium there is a difference of potential produced at points between which flow is taking place. This potential difference increases with the flow, hence with the applied pressure, and with the chemical constitution of the liquid and the dielectric properties of the permeable medium.

In the past this phenomenon has been utilized in "electrical logging" operations in which two electrodes vertically spaced a given distance apart are lowered into a well filled with water or mud. The liquid flows under hydrostatic pressure into the permeable formations penetrated by the well and hence there is a difference of potential set up between the surface of the formation at the well and the distant extremities thereof. This difference of potential causes a current to flow from the formation at the well to the distant portions, both directly through the formation itself and also through adjacent beds in a manner dependent upon their conductivity and proximity to the porous bed. This difference of potential is termed "permeability potential" for convenience. As a portion of the flow through these adjacent beds is through the mud in the well itself, there will be a certain portion of the total drop of potential through the relatively permeable bed which will be impressed across any vertical portion of the well. It is this fraction of the total "permeability potential" which is measured by the use of the two electrodes with the vertical separation between them, generally by transferring it to the surface of the earth by insulated conductors and there recording it on a chart having as its other coordinate the appropriate depth.

My invention is an improvement over the above system in a number of respects, and has the advantages, among others, that a substantial portion of the entire permeability potential drop is measured and that the interfaces between beds are more clearly delineated than has been formerly possible.

It is an object of my invention to provide a method for determining by electrical means the presence and location of permeable beds in earth formations traversed by a bore hole. A further object is to furnish a method and means whereby a substantial portion of the "permeability potential" generated when porous beds traversed by a well are subjected to hydraulic flow of an electrolyte is recorded as a function of the depth of the electrodes, so that the relative permeability of the various formations and their thickness can be determined more readily and more accurately than heretofore. Further objects will become apparent as the description of the method and apparatus proceeds.

In order better to understand the operation of my invention certain drawings illustrating equipment in accordance therewith have been made which are to be considered in conjunction with the specification and which form a part thereof.

Figure 1:
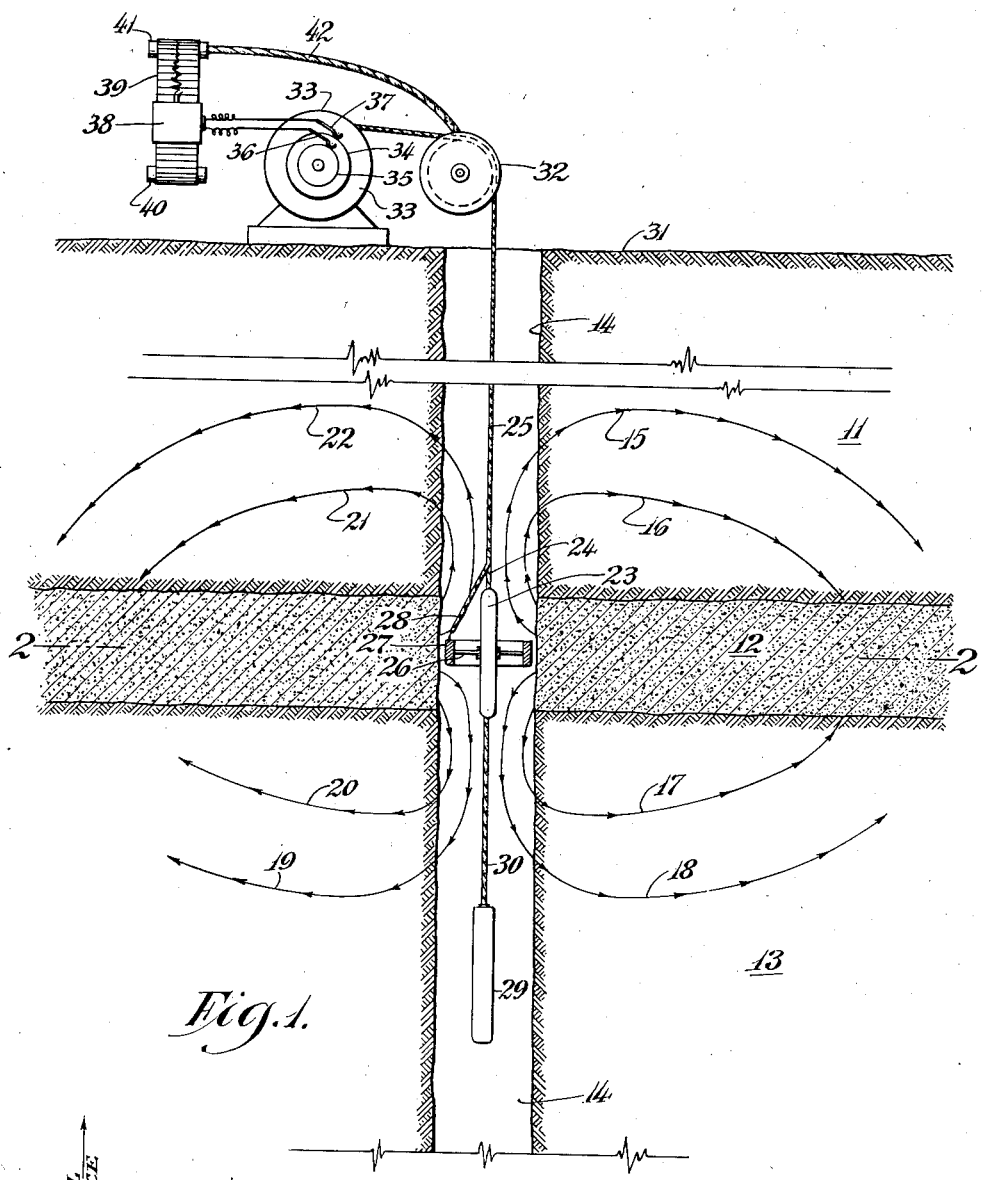
Figure 1 shows in diagrammatic form a vertical cross-section of a portion of the earth traversed by a well and one form of apparatus which can be used to carry out my invention.

In one of its broadest aspects my invention comprises measuring a function of the natural potential difference between a point located substantially on the axis of a well and at least one point located adjacent the wall of the well. Preferably these points are at substantially the same depth, and both are continuously raised or lowered together in the fluid, e. g. drilling mud or water, within the well being logged. A record of the changes in the natural potential difference between them or a function thereof is preferably continuously made at the top of the well. Obviously the logging operation must be carried out in a portion of the well which is uncased so that the natural potential differences existing can be measured.

Further explanation of the natural potential differences measured according to my invention may be in order so that the advantages thereof will be more easily appreciated. The cross-section of the earth shown in Figure 1 includes three formations 11, 12 and 13 penetrated by a well 14. Formations 11 and 13 are relatively impervious and formation 12 is a relatively permeable sand or similar formation. The well 14 has been filled with water or mud sufficiently so that there is a flow of fluid out from the well in all directions into the permeable formation 12. This flow of electrolyte through the permeable formation produces, by the phenomenon of electro-filtration, a drop of potential so that the face of the porous formation is at a certain potential with respect to the outward portions thereof, which can be considered to be at zero potential.

Accordingly, there will be a flow of electricity from the face of the porous formation in a general radial direction out to the more remote points thereof. However, formations 11 and 13 are also capable of conducting current, as in general they contain some formational water and are more or less conducting depending upon the amount of formational water and upon the salts dissolved in this water, so that there will be a flow of electricity from the face of the porous formation through formations 11 and 13 outwardly to the remote portions of the formation. An attempt has been made in Figure 1 to show diagrammatically some of these paths of current flow indicated by the numerals 15 to 22, inclusive. Due to the flow of current through other formation than the permeable formation itself there is a vertical potential drop in the mud in well 14. The points more nearly adjacent the surface of permeable formation 12 will be at a high potential relative to those more remote. The portion of the "permeability potential" which occurs in the well itself will vary depending upon the relative resistivity and current density in the fluid in the well 14, and in the adjacent formations 11 and 13. In no case will the total permeability potential be observed along the bore hole, as is apparent from an inspection of Figure 1. Accordingly, it is obviously impossible by lowering two vertically separated electrodes to measure the total "permeability potential" for any one formation.

In order to measure the permeability potential it would theoretically be most desirable to place one electrode at the exposed face of the permeable section and to place the other a long way back in the same formation (theoretically an infinite distance, although a distance of 20 to 40 feet would give almost the same results). However, I have found it possible to secure a result equivalent to this while employing two electrodes in the well itself. I accomplish this by placing one electrode as close as practically possible to the exposed face of the permeable medium and by placing the other at a spot whose potential is substantially lower. It will be noted that the region of zero potential far back in this permeable formation is characterized by the fact that there is no flow of electricity across any small volume in the region. If the current flow in the well itself be examined it will be noted that current is flowing in a roughly vertical direction near the walls of the well but that, assuming a symmetrical arrangement of the earth formations with respect to the well, there is no flow along the axis of the well itself. In other words, the axis of the well is a point of low potential. Accordingly, if an electrode is placed along the axis of the well and another electrode is placed substantially in contact with the exposed face of the well there will be a drop of potential between them which is a substantial fraction of the permeability potential.

A practical adaptation of this arrangement to a well logging apparatus is shown in Figure 1. Here there is a centrally disposed electrode 23 which is attached to one insulated conductor 24 of a two conductor insulated cable 25. From this centrally disposed electrode 23 there is supported by means of insulating rods 26, a second electrode which is in the form of a ring 27. This ring is attached to the other insulated conductor 28 of cable 25. The diameter of ring 27 is made as nearly as possible that of well 14, taking into account the practical difficulties of lowering an electrode of this shape into a well. It is usually advantageous to assist the normal gravitational pull upon the electrode assembly by attaching to the electrode assembly a weight 29 connected mechanically but not electrically to electrode 23 by means of cable 30. Other forms of weighting can of course be employed. It is also advantageous to make electrodes 23 and 27 out of exactly the same kind of metal, since otherwise there would be a difference of potential produced when the different metals were placed in the electrolytic well fluid.

Figure 2:
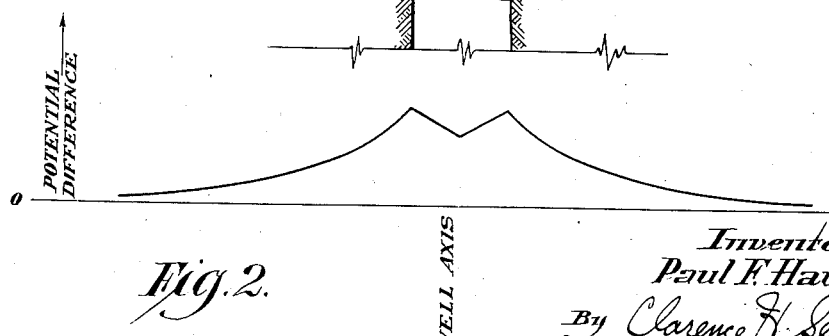
Figure 2 is a diagram of the natural potential differences which exist in the well and in the adjacent formations along line 2—2 of Figure 1 when sufficient hydrostatic pressure is applied to cause fluid to flow into the permeable portions thereof.

The potential drops which were spoken of immediately above, can be visualized by reference to Figure 2 in which the potential drop along the line 2—2 of Figure 1 is represented. Assuming that the potential of a point infinitely removed from the well bore is taken as zero the potential along the axis of the well will be much lower than the potential at the surface of the formation adjacent the well, and will increase radially until the boundary of well 14 is reached. From here the polarization potential will decrease in general as shown in Figure 2 towards zero which will be reached at an infinite distance from the well bore. By placing the ring electrode close to the face of the sand, a substantial fraction of the total potential drop is included between the two electrodes.

The question might arise as to the necessity for the use of the central electrode since the surface of the ground being also at substantially an infinite distance from the ring electrode is effectively at zero potential. The practical difficulty which renders the use of a surface electrode disadvantageous as compared with the use of a central well electrode is that there are relatively large circulating currents in the earth which would produce large and varying earth potentials between the ring electrode and the surface electrode, regardless of the permeability potential. By using the arrangement of electrodes shown in Figure 1, the central electrode is effectively shielded by the presence of the ring electrode against any stray earth currents and hence is not responsive to their presence.

A complete arrangement of apparatus for recording permeability potentials at the earth's surface 31 according to this invention is also shown in Figure 1. From well 14 cable 25 passes over a measuring sheave 32 and is stored on winch 33. The ends of the conductors in cable 25 are brought out to insulated slip rings 34 and 35 on winch 33, which are connected by means of brushes 36 and 37 to recording galvanometer 38. This recording galvanometer may, and preferably does, include an amplifier for the relatively weak potentials. The variations in permeability potential are recorded on chart 39 which is unreeled from supply reel 40 on to another reel 41, which is driven by flexible cable 42 from measuring sheave 32. By this means the permeability potential is recorded on chart 39 plotted against the depth of the electrodes. Many other variations in surface equipment could be used in accordance with well-known principles obvious to those skilled in the prior art.

Since the two measuring electrodes 23 and 27 have effectively no vertical spacing between them, the variation in potential with depth as these electrodes are lowered past porous formations will be more sharp and distinct than would be the case if the two electrodes were vertically separated as they have been heretofore. This results from the fact that the potential measured by two vertically separated electrodes is the average of the various average potentials produced along the well, whereas the arrangement shown utilizes the horizontal difference in potential, which is chiefly due to the particular formation opposite which the electrodes are positioned.

Various modifications of the basic principle of my invention could be used as will be understood by those skilled in the art. For example, instead of a ring electrode, a rod electrode supported in the hole so that it is close to one wall of the well and a second electrode disposed along the axis of the well, could be used.

While my invention has been described in connection with certain theoretical observations, I do not intend to limit myself by such statements of theory, nor by the details of particular apparatus described, but only by the scope of the appended claims.

I claim:

1. The method of logging permeable earth formations traversed by a fluid-containing well which comprises measuring a function of the natural potential difference between a point located substantially on the axis of said well and at least one point adjacent the wall of said well.

2. The method of logging permeable earth formations traversed by a fluid-containing well which comprises measuring a function of the natural potential difference between a point located substantially on the axis of said well and at least one other point adjacent the wall of said well and at substantially the same depth as said first-mentioned point.

3. The method of logging permeable earth formations traversed by a fluid-containing well which comprises measuring at various levels within said well a function of the natural potential difference between a first point located substantially on the axis of said well and at least one other point at substantially the same level as said first point and adjacent the wall of said well.

4. The method of logging permeable earth formations traversed by a fluid-containing well which comprises continuously changing the level within said well of an array including an electrode located substantially on the axis of said well and at least one other electrode horizontally spaced from said first-mentioned electrode and adjacent the wall of said well, and measuring a function of the natural potential difference between said electrodes.

5. The method of logging permeable earth formations traversed by a fluid-containing well which comprises continuously changing the level within said well of an array including an electrode located substantially on the axis of said well and at least one other electrode horizontally spaced from said first-mentioned electrode and adjacent the wall of said well producing electrical variations responsive to the natural potential difference between said electrodes, transmitting said electrical variations to the top of said well, and recording a function of said electrical variations at the surface of the earth.

6. The method of logging permeable earth formations traversed by a fluid-containing well which comprises continuously changing the level within said well of an array including an electrode located substantially on the axis of said well and a ring-shaped electrode surrounding said first-mentioned electrode and adjacent the wall of said well, producing electrical variations responsive to the natural potential difference between said electrodes, transmitting said electrical variations to the top of said well, and recording a function of said electrical variations at the surface of the earth.

PAUL F. HAWLEY.